(12) United States Patent
Wood et al.

(10) Patent No.: US 8,902,128 B2
(45) Date of Patent: Dec. 2, 2014

(54) TILED DISPLAY SYSTEM AND IMPROVEMENT THEREIN

(75) Inventors: Richard Wood, Waterford (CA); Delia Zsivanov, Waterloo (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 160 days.

(21) Appl. No.: 12/611,989

(22) Filed: Nov. 4, 2009

(65) Prior Publication Data

US 2011/0102300 A1    May 5, 2011

(51) Int. Cl.
  *G09G 5/00*    (2006.01)
  *H04N 9/31*    (2006.01)

(52) U.S. Cl.
  CPC ........... *H04N 9/3197* (2013.01); *H04N 9/3147* (2013.01)
  USPC ............................... 345/1.3; 345/1.1; 345/1.2

(58) Field of Classification Search
  USPC ..................... 345/1.1–1.3; 348/383
  See application file for complete search history.

(56) References Cited

U.S. PATENT DOCUMENTS

| | | | | |
|---|---|---|---|---|
| 5,734,446 A * | 3/1998 | Tokoro et al. | ................. | 348/745 |
| 5,897,192 A * | 4/1999 | Seufert | ............................. | 353/74 |
| 6,115,022 A * | 9/2000 | Mayer et al. | .................... | 345/418 |
| 6,480,175 B1 * | 11/2002 | Schneider | ......................... | 345/32 |
| 6,760,075 B2 * | 7/2004 | Mayer et al. | ................... | 348/383 |
| 6,791,513 B2 * | 9/2004 | Ogino et al. | ..................... | 345/55 |
| 7,029,124 B2 * | 4/2006 | Dubin et al. | ..................... | 353/69 |
| 2001/0024178 A1 | 9/2001 | Takeuchi et al. | | |
| 2005/0057435 A1 * | 3/2005 | Su | ................... | 345/1.3 |
| 2005/0140568 A1 * | 6/2005 | Inazumi | ....................... | 345/1.3 |
| 2007/0242234 A1 * | 10/2007 | Gulvin et al. | .................... | 353/84 |
| 2008/0284675 A1 | 11/2008 | Perkins et al. | | |
| 2010/0238090 A1 * | 9/2010 | Pomerantz et al. | ............ | 345/1.3 |
| 2010/0265160 A1 * | 10/2010 | Hajjar | ............................ | 345/1.3 |

FOREIGN PATENT DOCUMENTS

| | | |
|---|---|---|
| JP | H04269793 A | 9/1992 |
| JP | 2006042191 A | 2/2006 |
| JP | 2008268246 A | 11/2008 |
| JP | 2010282009 A | 12/2010 |
| WO | 2008117393 A1 | 10/2008 |

OTHER PUBLICATIONS

Corresponding Japanese Patent Application No. 2010-246594, "Notification of Reasons for Refusal" Apr. 28, 2014.

* cited by examiner

*Primary Examiner* — William Boddie
*Assistant Examiner* — Sahlu Okebato
(74) *Attorney, Agent, or Firm* — Perry + Currier Inc.

(57) ABSTRACT

An imaging system and improvement therein for edge blending a composite image displayed by a plurality of configurable display devices in a tiled display system or between display devices and the surrounding environment, by at least one of modifying one or more light emission characteristics in a region of the composite image adjacent the gaps or generating a pattern within the composite image that coincides with the spacing of the gaps, such that the visual seam becomes camouflaged when viewed from a distance. The light emission characteristics can, for example, include brightness and/or color and the pattern can, for example, be a grid pattern that coincides with the spacing of the gaps.

18 Claims, 6 Drawing Sheets

TILED DISPLAY SYSTEM AND IMPROVEMENT THEREIN

FIELD

The following is directed in general to tiled display systems having a plurality of displays arranged in a tiled pattern for generating respective portions of a composite image, and more particularly to an imaging system and improvement therein for camouflaging seams.

BACKGROUND

A large number of applications and potential applications exist for imaging systems such as projection displays that are used to display information. Such applications include, but are not limited to, general indoor signage (e.g. shopping malls, arcades, etc.), transportation signage (e.g. arrival/departure times, etc.), in-lobby signage for office buildings, control rooms, restaurants signage, etc.

The currently prevailing paradigm in the projection display industry is that improvement must be based on higher light power (lumens) at higher resolutions and progressively lower cost. This paradigm is based on the concept that higher resolution and higher power are necessary to develop larger displays with acceptable image quality and brightness using a least number of projectors. The current paradigm has served the industry well, but has a number of drawbacks which include: the significant cost associated with higher resolutions, limitations in projector resolution due to light valve/panel design, increased weight, increased cost and increased noise levels associated with cooling systems necessary to accommodate high power illumination.

US Patent Publication No. 2008/0284675 entitled "CONFIGURABLE IMAGING SYSTEM" sets forth a tiled display system having a plurality of display devices for generating respective portions of a composite image. Each display device includes coupling mechanisms for connection to at least one other display device such that the display devices may be arranged in multiple geometrical configurations of various sizes. The display devices include functionality to 'self-organize' the distribution of control signals and content over arrays of display devices of arbitrary shape and size. The term "array" is used broadly in this specification to mean any arrangement of interconnected display devices, and is not limited to a rectangular configuration of plural display devices.

It will be appreciated that gaps resulting from the physical spacing between adjacent display devices or between display devices and the surrounding environment (e.g. a wall, background architecture, etc.) may give rise to visible 'seams' in the composite image, due to abrupt changes in light emission at the locations of the gaps. This visually distracting artifact can be mitigated somewhat by minimizing the spacing between adjacent display devices or between display devices and the surrounding environment. However, it will be appreciated that these gaps and therefore the visual seam artifacts cannot be entirely eliminated.

SUMMARY

As set forth in greater detail below, an imaging system and improvement therein are set forth for edge blending the composite image between adjacent display devices of a tiled display system or between display devices and the surrounding environment, by at least one of modifying a light emission characteristic in a region of the composite image adjacent the gaps or generating a pattern within the composite image that coincides with the spacing of the gaps, such that the visual seam becomes camouflaged when viewed from a distance. The light emission characteristic can, for example, be brightness and/or colour and the pattern can, for example, be a grid pattern that coincides with the spacing of the gaps.

The invention relies on a perceptual tendency of the human eye to average the intensity of emitted light over given areas. For example, a CRT screen has a low aperture ratio and a pixel size of about 1 mm. However, at reasonable viewing distances, the individual light and dark areas are difficult to detect. The inventors have recognized that this same principle may be applied to the seams between adjacent display devices or between display devices and the surrounding environment. Thus, as described in greater detail below, light emission characteristic of the display elements adjacent to the seam can be modified (e.g. made brighter) in order to compensate for the light missing at the seam.

In one embodiment, the gap or seam is masked or camouflaged by making the composite image brighter along the edges of adjacent display devices such that, within the limits of resolution, the composite image is perceived to be an approximate average of the area of missing light in the gap and the area of brighter light adjacent thereto. The exact configuration of the brighter edge may be dependent on the content of the composite image and may also be imposed through a random or regular pattern. The relative brightness may also be adjusted dependent on the distance of the viewer from the tiled display system.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings, in which.

DETAILED DESCRIPTION

Figure 1:
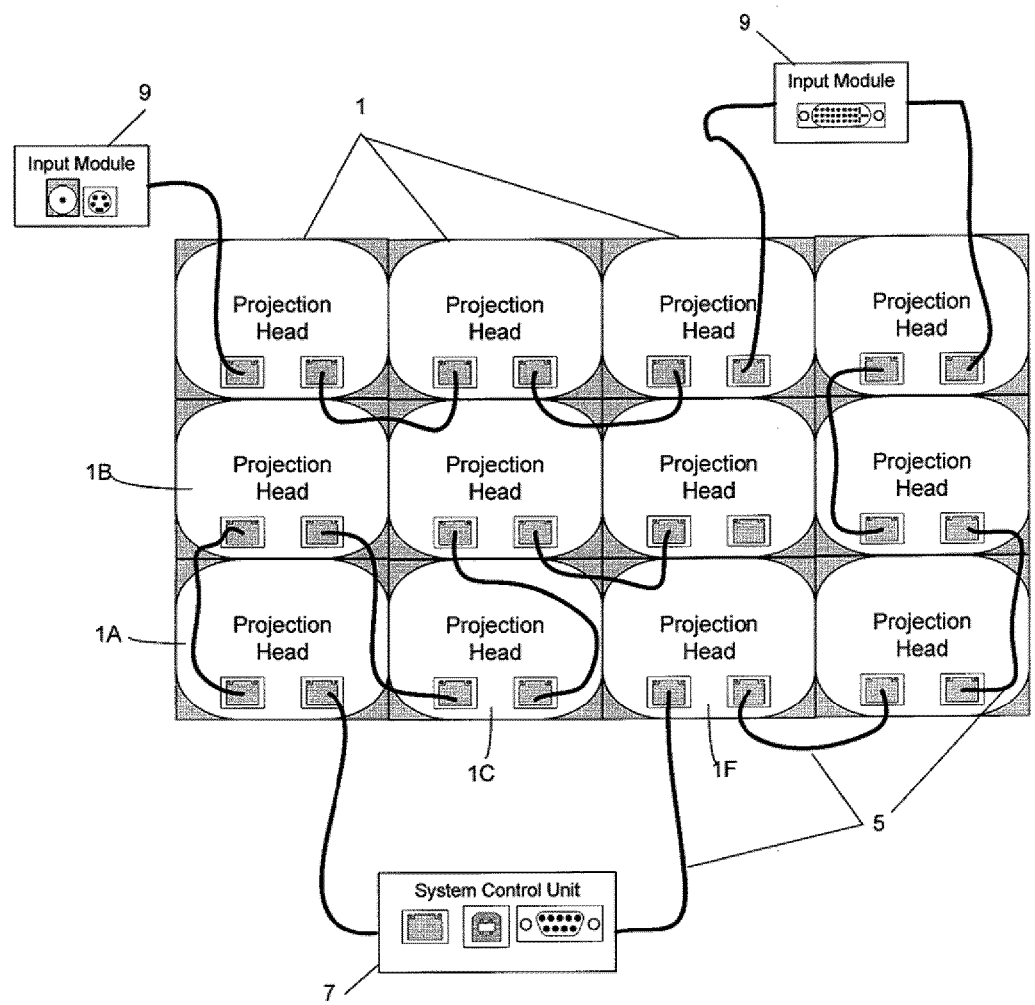
FIG. 1 is a block diagram of an exemplary tiled display system comprising a plurality of display devices in connection with which the invention operates.

Before describing embodiments of the imaging system and improvement for camouflaging seams according to the present invention, it will be helpful to describe an exemplary tiled display system in connection with which the invention may be applied. To that end, FIG. 1 shows a tiled display system as described in US Patent Publication No. 2008/

0284675 entitled "CONFIGURABLE IMAGING SYSTEM". The system comprises a plurality of display devices or projection heads 1 assembled to form an array. Cables 5 are used to connect the display devices 1 in any sequence. According to one embodiment, command messages are embedded in the blanking interval of a video data stream.

A person of skill in the art will appreciate that the present invention is applicable to other types of tiled display systems, than that described in US Patent Publication No. 2008/0284675, such as tiled LCD, CRT, OLED, LED displays, etc. To that end, all references herein to "pixel" or "pixels" will be understood to include display or picture elements of such other types of tiled display systems.

Each display device 1 contains a light engine and circuitry (including, for example, a microprocessor, RAM frame buffer and video processing to provide image capture, resizing, color matching, edge blending, etc.). Data received from an adjacent display device 1 via cable 5 is buffered and retransmitted to the next (e.g. series-connected) display device 1. The video processing circuitry preferably includes modules for sub-image capture and resizing, color matching, edge blending, uniformity correction and 2D keystoning. Also, color, brightness and image uniformity may be achieved using intelligent self-alignment of images between display devices 1 and intelligent brightness and color control, as described in greater detail with reference to US Patent Publication No. 2008/0284675 entitled "CONFIGURABLE IMAGING SYSTEM".

At least one system control and power unit 7 is connected to an available port on one of the display devices 1 for providing power (e.g. 48 V DC) and to facilitate automatic detection of the configuration of interconnected display devices 1. Typically, the system control and power unit 7 includes at least one Ethernet, USB and/or infrared port to a user interface (not shown), and generates full frame static images (i.e. transfer image content from a SD (Secure Digital) flash card to a frame buffer for display), as well as implementing OSD (on-screen display) overlays (OSD allows the user to view and change display settings on-screen).

At least one input unit 9 is also connected to an available port on one of the display devices 1 for providing a video and/or image source for display by the display devices 1. Preferably, the input unit 9 performs video processing, such as de-interlacing, scaling, frame rate conversion, etc.

Each display device 1 requires electronic communication only with adjacent display devices (or input unit(s) 9 or the system control unit 7, any of which can be connected anywhere in the chain of series-connected display devices 1), provided that an electronic signal path from the system control and power unit 7 and input units 9 extends via respective display devices 1 and associated cables 5 to each display device 1.

As discussed in greater detail with reference to US Patent Publication No. 2008/0284675 entitled "CONFIGURABLE IMAGING SYSTEM", a variety of different mechanical coupling mechanisms are possible for achieving accurate alignment of each display device 1 with respect to its adjacent interconnected display devices 1. According to one embodiment, the display devices are in the form of "blocks" having coupling mechanisms to permit registration or alignment of display devices based on the shapes of protrusions on respective side surfaces of each display device. As discussed above, the display devices are not required to be arranged in rectangular configurations, thereby resulting in significant flexibility in terms of display design.

The front surface of each such display device comprises a self-contained screen. A small rear projector (including light source, light valve, optics and associated electronics) is provided within each display device for projecting an image on the screen. According to an exemplary embodiment, the light source is implemented using LEDs, although it is contemplated that lasers or other light sources may be utilized, the selection and implementation of which would be known to a person of ordinary skill in the art.

According to another embodiment, rather than provide a plurality of microtile "blocks", a "grid" of display devices may be connected via tubular coupling mechanisms. In such an embodiment there is no self-contained screen. Rather, a small rear projector (including light source, light valve, optics and associated electronics) is provided within each display device for projecting an image onto a remote screen such that each display device projects a portion of a composite image onto the remote screen.

Figure 2:
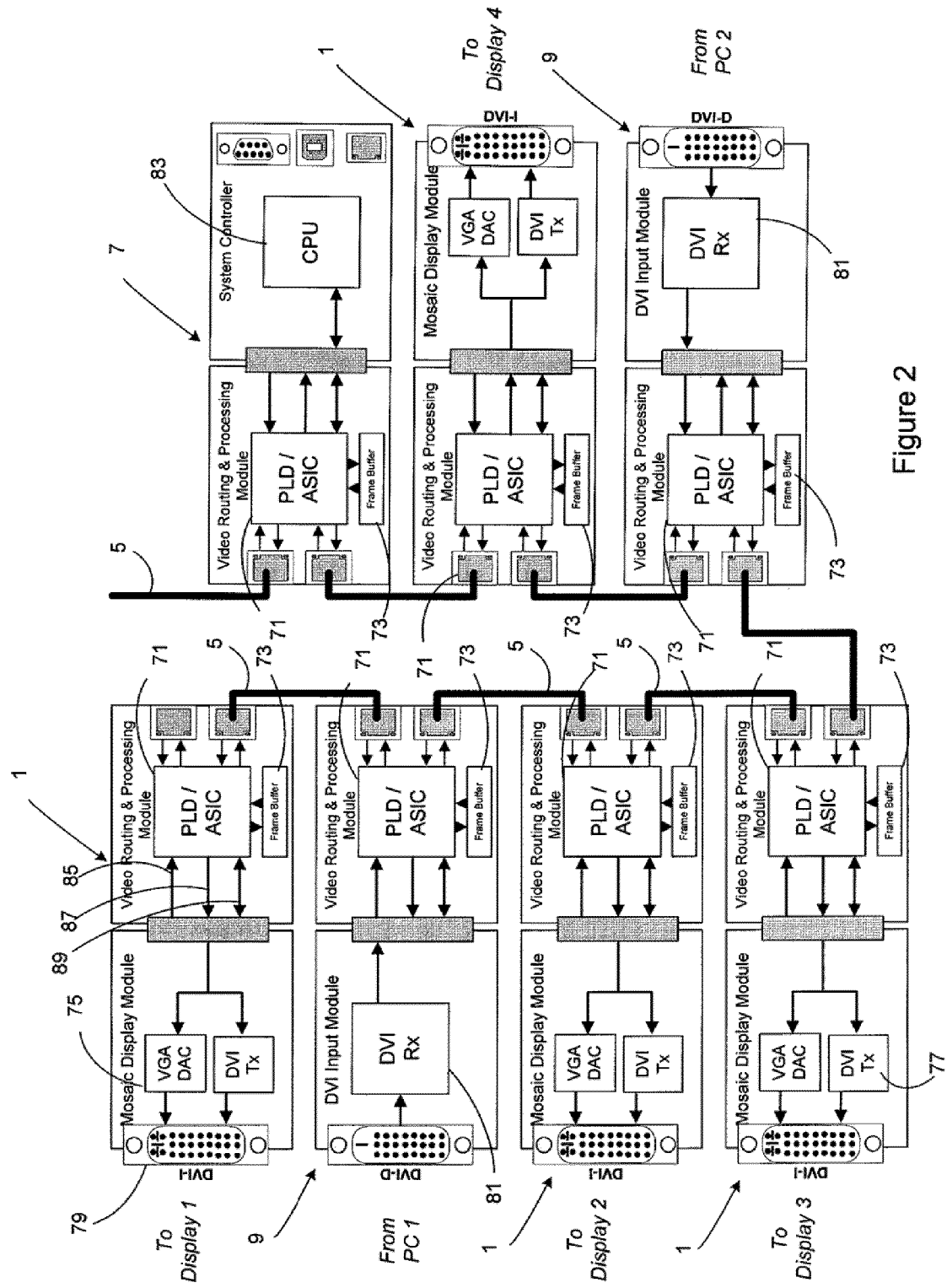
FIG. 2 is a block diagram showing an arrangement of display devices, input modules and a system controller according to the tiled display system of FIG. 1.

Turning to FIG. 2, a block diagram is provided showing electronic components of an arrangement of display devices 1, input modules 9 and a system controller 7 as set forth in US Patent Application, Publication No. 2008/0284675 entitled "CONFIGURABLE IMAGING SYSTEM". Each display device 1, input module 9 and a system controller 7 incorporates a video routing and processing module comprising PLD/ASIC 71 and frame buffer 73 for receiving, transmitting and operating on video and command signals. The functional circuitry of each video routing and processing module is identical but operates on video and command signals in accordance with its 'personality' as a display device 1, input module 9, or system controller 7. Thus, the video routing and processing module of each display device 1 communicates with an associated mosaic display module comprising digital to analog converter (DAC) 75 and DVI transmitter 77 for transmitting video signals to an associated light engine via a DVI connector 79. Likewise, each input module 9 includes a DVI receiver 81 for receiving video signals from a source, such as a PC via a DVI connector 79, and each system controller 7 includes a CPU 83 for exchanging command/control messages with other units, via its video routing and processing module.

Video signals are input to the video routing and processing module via an input bus 85, and video signals are output therefrom via an output bus 87. CPU command signals are exchanged via a control bus 89.

Having described an exemplary embodiment of tiled display system in connection with which the present invention may be applied; reference will be made to FIGS. 3-6 for describing embodiments of the invention. Also, a person of skill in the art will appreciate that the invention may be applied to other tiled display systems than as set forth above with reference to FIGS. 1 and 2 and as described in US Patent Application, Publication No. 2008/0284675 entitled "CONFIGURABLE IMAGING SYSTEM".

Figure 3:
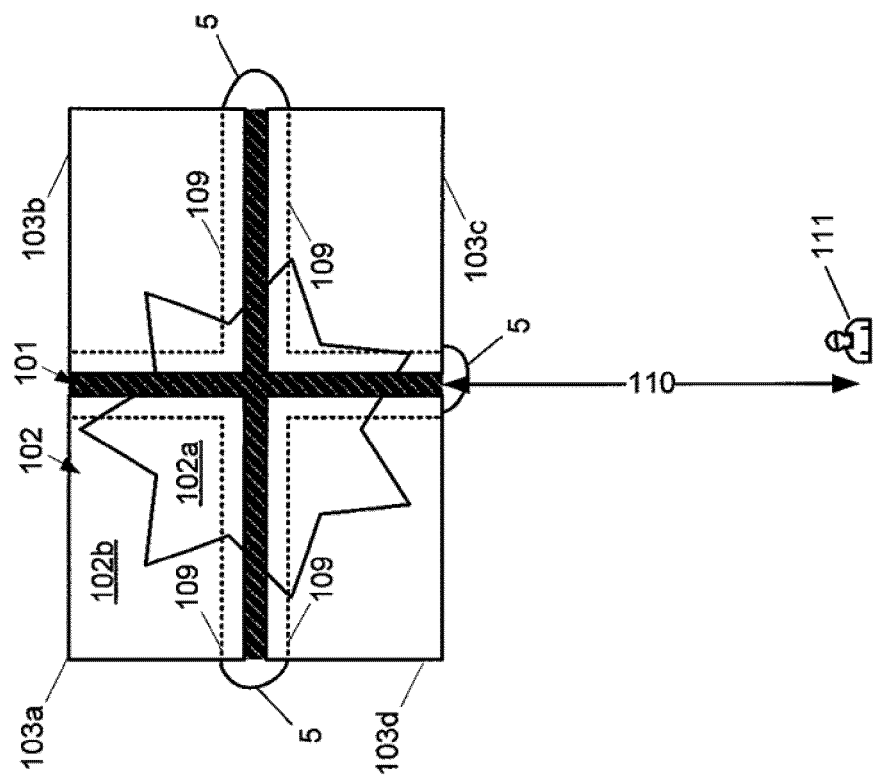
FIG. 3 depicts a tiled display system of display devices and the visual seams created by gaps along the edges of adjacent display devices.

FIG. 3 depicts a 2×2 array of display devices 103a, 103b, 103c, 103d for displaying a composite image 102. A visual seam 101 appears in the composite image 102 as a result of the absence of light within the gaps between adjacent units. As discussed above, the seam can be visually unappealing and/or distracting to a viewer 111.

According to a first embodiment, the video routing and processing modules of display devices 103, as described above with reference to FIG. 2, operate to modify a light emission characteristic of the display elements (e.g. pixels) in an area 109 adjacent the seam 101 according to a mathematical function, such as an average of light or spectral intensity between area 109 and seam 101 such that the above-described perceptual tendency of the human eye operates to blend the light emission characteristic between the seam 101 and area 109 when viewed from a distance 110, thereby camouflaging the seam 101. For example, light emission of the display elements may be increased in portions of area 109 where the adjacent portion of image 102 is brighter than the seam 101. Where a portion 102a of image 102 is darker than another portion 102b, the brightness of area 109 may be increased more in portions adjacent 102b than in portions adjacent 102a, so that the localized brightness of the seam 101 and area 109 averages the brightness of the adjacent image portion 102a or 102b.

Where the image 102 is dynamic, such that bright and dark portions are moving, changing and/or fading in and out, the brightness of area 109 may also be dynamically controlled relative to the adjacent portion of image 102 for averaging the brightness of area 109 and the seam 101 with the dynamically changing adjacent image portion 102a or 102b.

A person of skill in the art will also understand that the camouflaging effect is dependent on the size of the gaps that give rise to seam 101 as well as the distance 110 of the viewer 111 from the tiled display system. For example, if display devices 103 are inspected from 3 meters (e.g. about 10 feet) away, the seam 101 is more noticeable than if display devices 103 are inspected from 6 meters (e.g. about 20 feet) away. Similarly, wider seams are usually more noticeable than narrower seams. Hence, the brightness and/or size of area 109 can be adjusted based on the given distance 110 and the width of seam 101.

The brightness of area 109 relative to brightness of the adjacent portion of image 102 can be any suitable amount, including but not limited to approximately 10% to 50% above the brightness the adjacent portion of image 102. Also, the relative brightness can be dependent on a display element (e.g. pixel) size of the display device 103. For example, when the width of the seam 101 is 10% of the pixel size, the brightness of area 109 needs to be less than 10% brighter than at least a portion of image 102.

Figure 4:
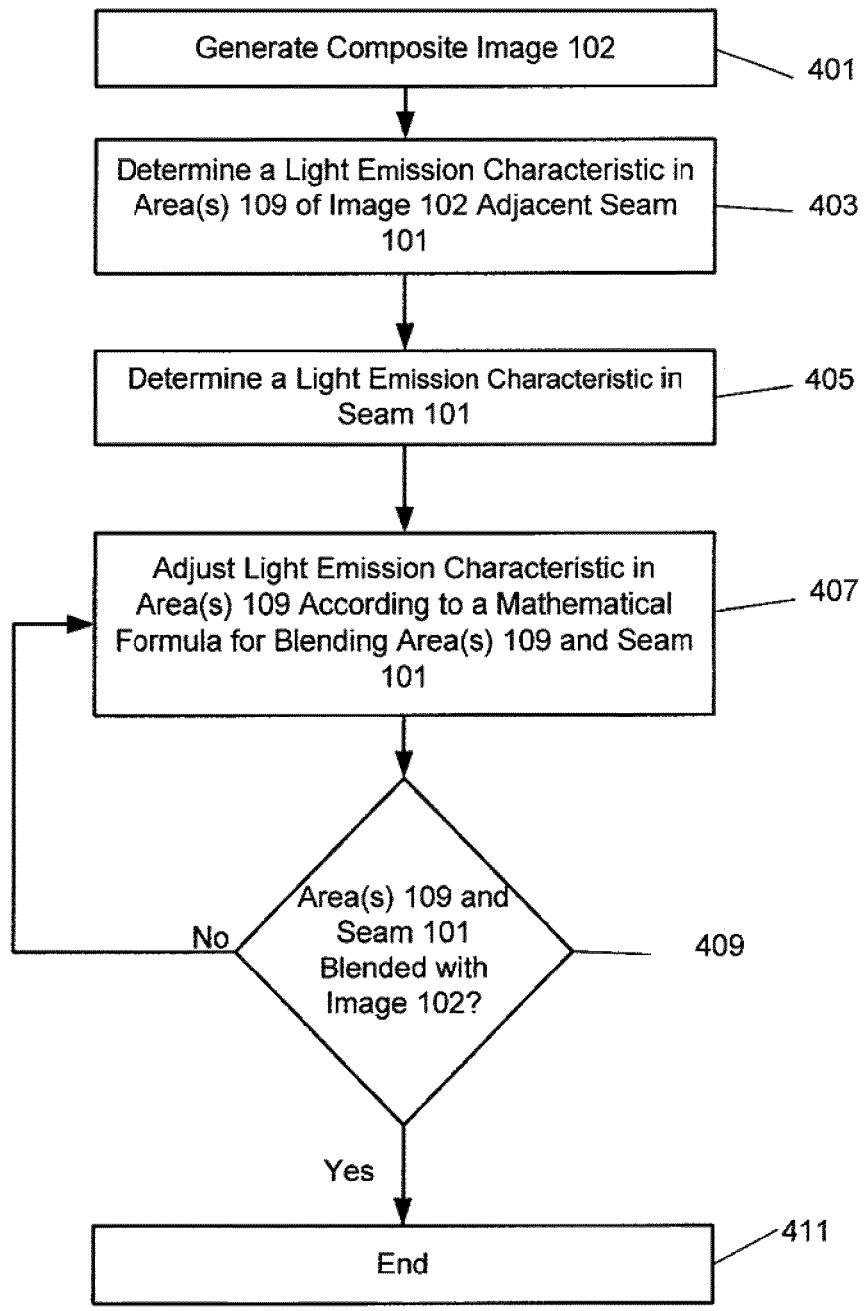
FIG. 4 is a flowchart depicting a method for camouflaging seams in the tiled display system of FIG. 3.

FIG. 4 depicts steps in the method for camouflaging seam 101 discussed above with reference to FIG. 3. First, the composite image 102 is generated and displayed via display devices 103a, 103b, 103c, 103d (401). Next, a light emission characteristic (e.g. brightness) is determined in the area or respective areas 109 of image 102 adjacent seam 101 (403) and in the seam 101 (405). Then, the determined light emission characteristic is adjusted in area(s) 109 according to a mathematical formula such as an average between the light emission characteristics of the area(s) 109 of image 102 and seam 101 (407). If the area(s) 109 and seam 101 are sufficiently blended so as to camouflage the seam 101 (a "Yes" at 409) the method ends (411). Otherwise, the determined light emission characteristic is adjusted again in portion(s) 109 (407).

A person of skill in the art will appreciate that the method of FIG. 4 may be used to camouflage seam 101 where the seam is brighter, rather than darker, than the adjacent area 109 of image 102. Also, a skilled person will appreciate that a mathematical function other than a simple average may be used to adjust the light emission characteristic of the area 109.

The adjustment of light emission characteristic (407) and the determination of whether areas(s) 109 and seam 101 are sufficiently blended (409) may be effected manually by the viewer 111, or may be performed automatically by creating a feedback path between the tiled display system and the video routing and processing module(s), for example via a camera (i.e. at the location of viewer 111 in FIG. 3).

Adjustment of the light emission characteristic in area(s) 109 can be controlled by adjusting brightness, as discussed above, or by any other suitable means. For example, the video routing and processing modules of display devices 103 can be controlled to change light emission of area 109 by displaying a pattern in the area(s) 109. The pattern may comprise at least one of a regular pattern, a random pattern, an intermittent pattern, a solid pattern, a saw tooth pattern, and the like. Indeed, any suitable pattern is within the scope of present embodiments, as long as the resultant adjustment of the light emission characteristic is such that the area(s) 109 and seam 101 are sufficiently blended so as to camouflage the seam 101. Alternatively, the brightness adjustment in area 109 can be controlled by optical/mechanical means rather than via the video routing and processing modules.

Figure 5:
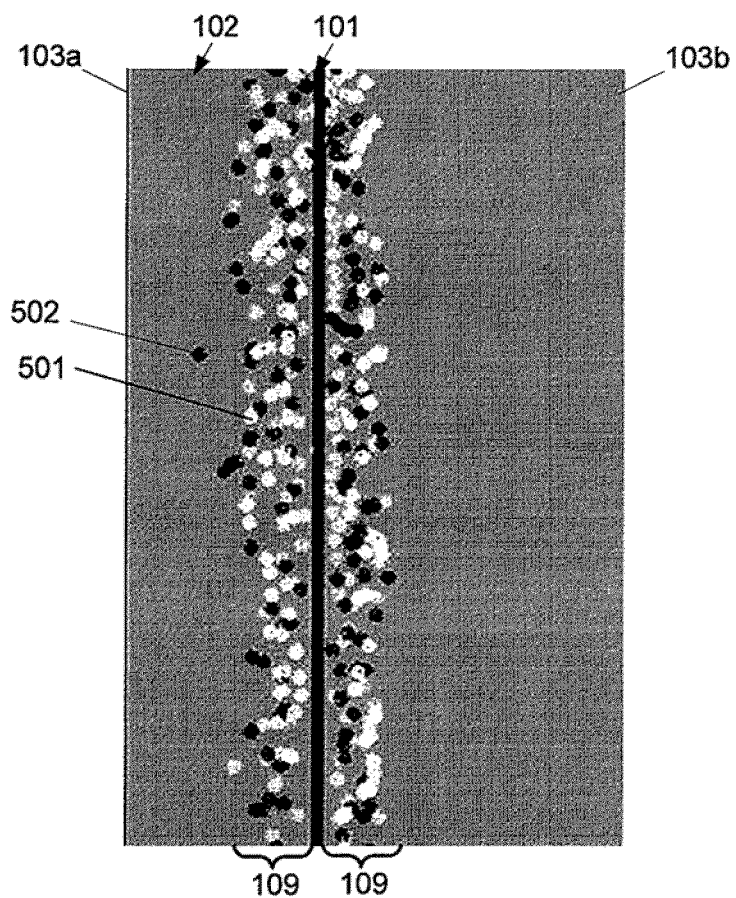
FIG. 5 is a detail view of a visual seam being camouflaged by the introduction of regular and/or intermittent noise in an area adjacent the seam.

The light emission characteristic in area(s) 109 can also, for example, be adjusted by the introduction of regular and/or intermittent noise, as depicted in FIG. 5, wherein noise in areas 109 is represented by white dots 501 and/or black dots 502 (and/or grey dots) combined with image 102. The noise can be white noise and/or any suitable colour and/or any suitable combination of colours and/or shades of grey.

Figure 6A:
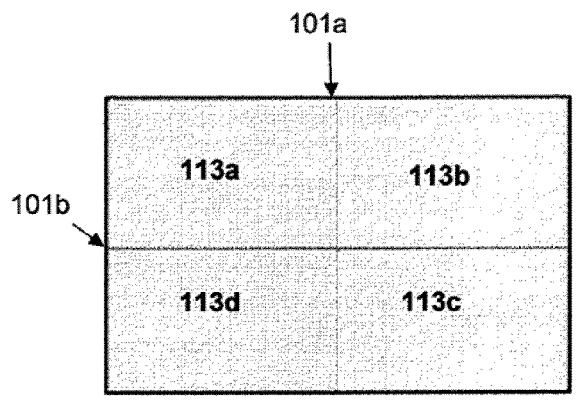
FIGS. 6A, 6B and 6C, show generation of a pattern within a composite image across tiled display system of FIG. 1 that coincides with the spacing of the gaps between adjacent display devices, according to an alternative embodiment.
Figure 6B:
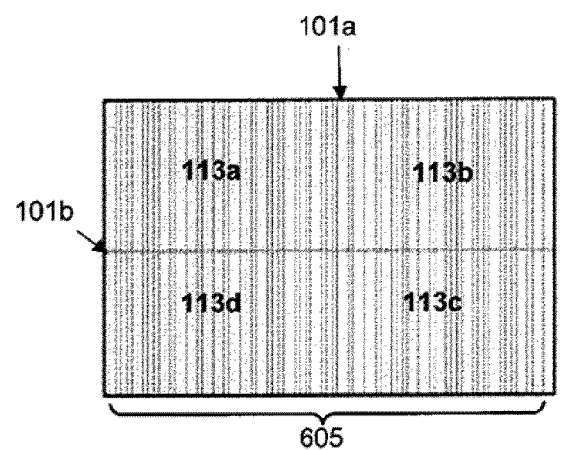
Figure 6C:
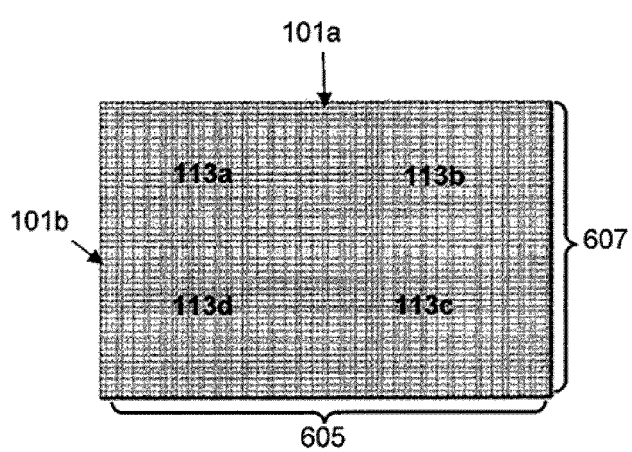

According to an alternative embodiment, the mosaic display modules of display devices 113 generate a pattern within the composite image 102 that coincides with the spacing of the gaps, such that the visual seam becomes camouflaged when viewed from a distance. As shown in the example of FIG. 6A, four display devices 113a, 113b, 113c and 113d are arranged in a 2×2 array such that adjacent display devices are separated by a vertical seam 101a and a horizontal seam 101b. In FIG. 6B, the video routing and processing modules of display devices 113a, 113b, 113c and 113d have been controlled to generate regularly spaced vertical lines (alternating light and dark) to camouflage the vertical seam 101a, while in FIG. 6C, the video routing and processing modules of display devices 113a, 113b, 113c and 113d have been controlled to generate regularly spaced vertical and horizontal lines across the composite image to camouflage both vertical and horizontal seams 101a and 101b. The perceptibility of the lines diminishes with viewing distance as a result of the above-described averaging ability of the human eye. It will be appreciated that non-rectangular configurations of tiled displays may give rise to visual seams that are neither vertical nor horizontal. The principles set forth herein may be applied so that spaced lines are generated that are neither vertical nor horizontal but are substantially parallel to the visual seams for camouflaging the seams.

A person skilled in the art, having read this description of the preferred and alternative embodiments, may conceive of variations and other alternative embodiments. For example, although the illustrated embodiments set forth camouflaging of seams between adjacent display devices, it will be appreciated that the principles described herein may be applied to camouflaging visual seams between display devices and the surrounding environment, such as walls, background architecture, etc. Also, the same principles may be applied to camouflaging an area of degraded/irregular display elements, in which case the video routing and processing module can modify a light emission characteristic of the display elements in an area surrounding the degraded/irregular display elements, for example by averaging brightness or spectral intensity between the surrounding area and the degraded/irregular display elements such that the above-described perceptual tendency of the human eye operates to blend the light emission characteristic between the degraded/irregular display elements and surrounding area when viewed from a distance 110, thereby camouflaging the degraded/irregular display elements.

All such variations and alternative embodiments are believed to be within the ambit of the claims appended hereto.

What is claimed is:

1. In an imaging system for displaying a composite image across adjacent display devices, the front surface of each such display device comprising a self-contained screen onto which a portion of the composite image is displayed, respective ones of said display devices having gaps between at least one other adjacent display device or a surrounding area resulting in visible seams due to the absence of light, the improvement comprising a video routing and processing module for at least one of increasing one or more light emission characteristics within the composite image displayed onto the front surface of each such display device adjacent but outside said gaps by an average of light or spectral intensity between said gaps and the image displayed adjacent said gaps in order to compensate for the light missing from said gaps, or generating a pattern within the composite image displayed onto the front surface of each such display device adjacent but outside said gaps that makes the composite image brighter along the edges of said gaps, thereby camouflaging said visible seams resulting from said gaps.

2. The improvement of claim 1, wherein said light emission characteristics include at least one of brightness and colour.

3. The improvement of claim 1, wherein said pattern comprises a grid of horizontal and vertical lines that coincides with the spacing of said gaps.

4. The improvement of claim 1, wherein increasing one or more light emission characteristics comprises generating a continuous bright line in said region adjacent said gaps.

5. The improvement of claim 1, wherein increasing one or more light emission characteristics comprises generating intermittent bright areas in said region adjacent said gaps.

6. The improvement of claim 1, wherein said pattern comprises bright areas superimposed over said composite image in said region adjacent said gaps.

7. The improvement of claim 1, wherein increasing one or more light emission characteristics comprises generating random bright and dark areas in said region adjacent said gaps.

8. The improvement of claim 1, wherein increasing one or more light emission characteristics comprises generating intermittent bright and dark areas in said region adjacent said gaps.

9. The improvement of claim 1, wherein said pattern comprises bright and dark areas superimposed over said composite image in said region adjacent said gaps.

10. An imaging system, comprising:
a composite image source; and
a plurality of display devices configurable in a plurality of geometrical configurations, the front surface of each such display device comprising a self-contained screen onto which a portion of the composite image is displayed, respective ones of said display devices having gaps between at least one other adjacent display device or a surrounding area resulting in visible seams due to the absence of light, each display device including a video routing and processing module for receiving said composite image and in response generating respective portions thereof and at least one of increasing one or more light emission characteristics within the composite image displayed onto the front surface of each such display device adjacent but outside said gaps by an average of light or spectral intensity between said gaps and the image displayed adjacent said gaps in order to compensate for the light missing from said gaps, or generating a pattern within the composite image displayed onto the front surface of each such display device adjacent but outside said gaps that makes the composite image brighter along the edges of said gaps, thereby camouflaging said seams resulting from said gaps.

11. The imaging system of claim 10, wherein said light emission characteristics include at least one of brightness and colour.

12. The imaging system of claim 10, wherein said pattern comprises a grid of horizontal and vertical lines that coincides with the spacing of said gaps.

13. The imaging system of claim 10, wherein increasing one or more light emission characteristics comprises generating a continuous bright line in said region adjacent said gaps.

14. The imaging system of claim 10, wherein increasing one or more light emission characteristics comprises generating intermittent bright areas in said region adjacent said gaps.

15. The imaging system of claim 10, wherein said pattern comprises bright areas superimposed over said composite image in said region adjacent said gaps.

16. The imaging system of claim 10, wherein increasing one or more light emission characteristics comprises generating random bright and dark areas in said region adjacent said gaps.

17. The imaging system of claim 10, wherein increasing one or more light emission characteristics comprises generating intermittent bright and dark areas in said region adjacent said gaps.

18. The imaging system of claim 10, wherein said pattern comprises bright and dark areas superimposed over said composite image in said region adjacent said gaps.

* * * * *